(12) United States Patent
Morita et al.

(10) Patent No.: US 10,207,537 B2
(45) Date of Patent: Feb. 19, 2019

(54) METHOD FOR MANUFACTURING HUB RING AND METHOD FOR MANUFACTURING VEHICLE BEARING APPARATUS

(71) Applicant: JTEKT CORPORATION, Osaka-shi, Osaka (JP)

(72) Inventors: Kenichi Morita, Kitakatsuragi-gun (JP); Yuu Katsuyama, Yao (JP); Ryoichiro Kotani, Kashiwara (JP); Hiroyoshi Komatsu, Minamikawachi-gun (JP); Toru Sasaki, Kashiwara (JP)

(73) Assignee: JTEKT CORPORATION, Osaka-shi (JP)

( * ) Notice: Subject to any disclaimer, the term of this patent is extended or adjusted under 35 U.S.C. 154(b) by 0 days.

(21) Appl. No.: 15/392,129

(22) Filed: Dec. 28, 2016

(65) Prior Publication Data
US 2017/0106695 A1    Apr. 20, 2017

Related U.S. Application Data

(62) Division of application No. 14/176,620, filed on Feb. 10, 2014, now abandoned.

(30) Foreign Application Priority Data

Feb. 15, 2013   (JP) ................................. 2013-028229

(51) Int. Cl.
*B21K 1/40*     (2006.01)
*B24B 7/04*     (2006.01)
(Continued)

(52) U.S. Cl.
CPC .............. *B60B 27/001* (2013.01); *B21K 1/40* (2013.01); *B24B 7/04* (2013.01); *B24B 15/00* (2013.01);
(Continued)

(58) Field of Classification Search
CPC .. B23P 13/02; B23P 2700/50; B23C 2215/08; B21K 1/40; B21K 1/761;
(Continued)

(56) References Cited

U.S. PATENT DOCUMENTS 6,099,167 A    8/2000  Goto et al.
6,250,814 B1   6/2001  Tajima et al.
(Continued)

FOREIGN PATENT DOCUMENTS

CN    1406775 A    4/2003
CN    102430965 A  5/2012
(Continued)

OTHER PUBLICATIONS

Mar. 3, 2017 Office Action issued in Chinese Patent Application No. 201410049712.2.
(Continued)

*Primary Examiner* — Christopher J Besler
(74) *Attorney, Agent, or Firm* — Oliff PLC (57) ABSTRACT

A method for manufacturing a vehicle bearing apparatus includes a method for manufacturing a hub ring. The hub ring includes a seal facing surface, a flange portion, and a shaft body portion. The flange portion includes a thin portion, a thick portion, bolt holes, a thin portion outer surface, a thick portion outer surface, and bolts. The flange portion protrudes outward from the shaft body portion. The thick portion is formed on an outer side with respect to the bolt holes in the flange portion, and the thin portion is formed on an inner side with respect to the thick portion in the flange portion. In the method for manufacturing the hub ring, machining is performed on the thick portion outer surface by using the seal facing surface subjected to grinding, as a reference surface, after the bolts are fitted into the flange portion.

1 Claim, 6 Drawing Sheets

(51) Int. Cl.
*B24B 15/00* (2006.01)
*B60B 27/00* (2006.01)

(52) U.S. Cl.
CPC .......... *B60B 27/00* (2013.01); *B60B 27/0005* (2013.01); *B60B 27/0047* (2013.01); *B60B 2310/228* (2013.01); *B60B 2310/231* (2013.01); *B60B 2310/234* (2013.01); *B60B 2310/316* (2013.01); *Y10T 29/49535* (2015.01)

(58) Field of Classification Search
CPC .... B21K 1/762; B21K 1/28; B60B 2310/228; B60B 2310/231; B60B 2310/234
See application file for complete search history.

(56) References Cited

U.S. PATENT DOCUMENTS

| | | | |
|---|---|---|---|
| 6,415,508 B1 | 7/2002 | Laps | |
| 6,829,825 B1* | 12/2004 | Bowman | B23B 5/02 |
| | | | 29/894.3 |
| 2003/0059144 A1 | 3/2003 | Umekida et al. | |
| 2006/0110087 A1* | 5/2006 | Igari | B23B 5/02 |
| | | | 384/544 |
| 2009/0106980 A1 | 4/2009 | Hirai et al. | |
| 2010/0210369 A1 | 8/2010 | Masuda et al. | |

FOREIGN PATENT DOCUMENTS

| | | |
|---|---|---|
| EP | 1 288 021 A2 | 3/2003 |
| JP | H11-182538 A | 7/1999 |
| JP | 2000-301401 A | 10/2000 |
| JP | 2001-334803 A | 12/2001 |
| JP | 2003-154801 A | 5/2003 |
| JP | 4062316 B2 | 3/2008 |
| JP | 2010-105439 A | 5/2010 |
| JP | 2010-215224 A | 9/2010 |

OTHER PUBLICATIONS

Jun. 12, 2014 Extended European Search Report issued in European Patent Application No. 14154426.2.

Nov. 22, 2016 Office Action issued in Japanese Patent Application No. 2013-028229.

\* cited by examiner

METHOD FOR MANUFACTURING HUB RING AND METHOD FOR MANUFACTURING VEHICLE BEARING APPARATUS

INCORPORATION BY REFERENCE

This is a Division of U.S. application Ser. No. 14/176,620 filed Feb. 10, 2014, which claims the benefit of Japanese Patent Application No. 2013-028229 filed on Feb. 15, 2013. The disclosures of the prior applications are hereby incorporated by reference herein in their entireties.

BACKGROUND OF THE INVENTION

1. Field of the Invention

The invention relates to a method for manufacturing a hub ring and a method for manufacturing a vehicle bearing apparatus.

2. Description of Related Art

A conventional vehicle bearing apparatus includes a hub ring. The hub ring includes a flange portion. The flange portion has bolt holes and an outer surface. Bolts for fixing the vehicle hearing apparatus to a brake rotor are press-fitted into bolt holes, respectively. The outer surface is formed as a surface on a vehicle outer side in an axle direction. The outer surface is brought into contact with the brake rotor. Japanese Patent Application Publication No. 11-182538 (JP 11-182538 A) describes an example of a conventional vehicle bearing apparatus.

In the conventional vehicle bearing apparatus, the bolts are press-fitted into the bolt holes, respectively. Therefore, the outer surface may be warped due to press fitting. Thus, flange runout may become larger.

SUMMARY OF THE INVENTION

An object of the invention is to provide a method for manufacturing a hub ring, and a method for manufacturing a vehicle bearing apparatus, which make it possible to suppress flange runout.

According to an aspect of the invention, there is provided a method for manufacturing a hub ring, the hub ring including a flange portion and a shaft body portion, the flange portion including bolt holes, an outer surface, and bolts being formed on an outer periphery of the shaft body portion, the bolts being press-fitted into the bolt holes, respectively, and the outer surface forming a surface of the flange portion on a vehicle outer side in an axle direction. The method includes press-fitting the bolts into the bolt holes, respectively; forming a reference surface in the shaft body portion by performing grinding on the shaft body portion, the reference surface being orthogonal to or parallel to the axle direction; and performing machining on the outer surface by using the reference surface as a reference, after the bolts are press-fitted into the bolt holes, respectively.

BRIEF DESCRIPTION OF THE DRAWINGS

The foregoing and further features and advantages of the invention will become apparent from the following description of example embodiments with reference to the accompanying drawings, wherein like numerals are used to represent like elements and wherein.

DETAILED DESCRIPTION OF EMBODIMENTS

Figure 1:
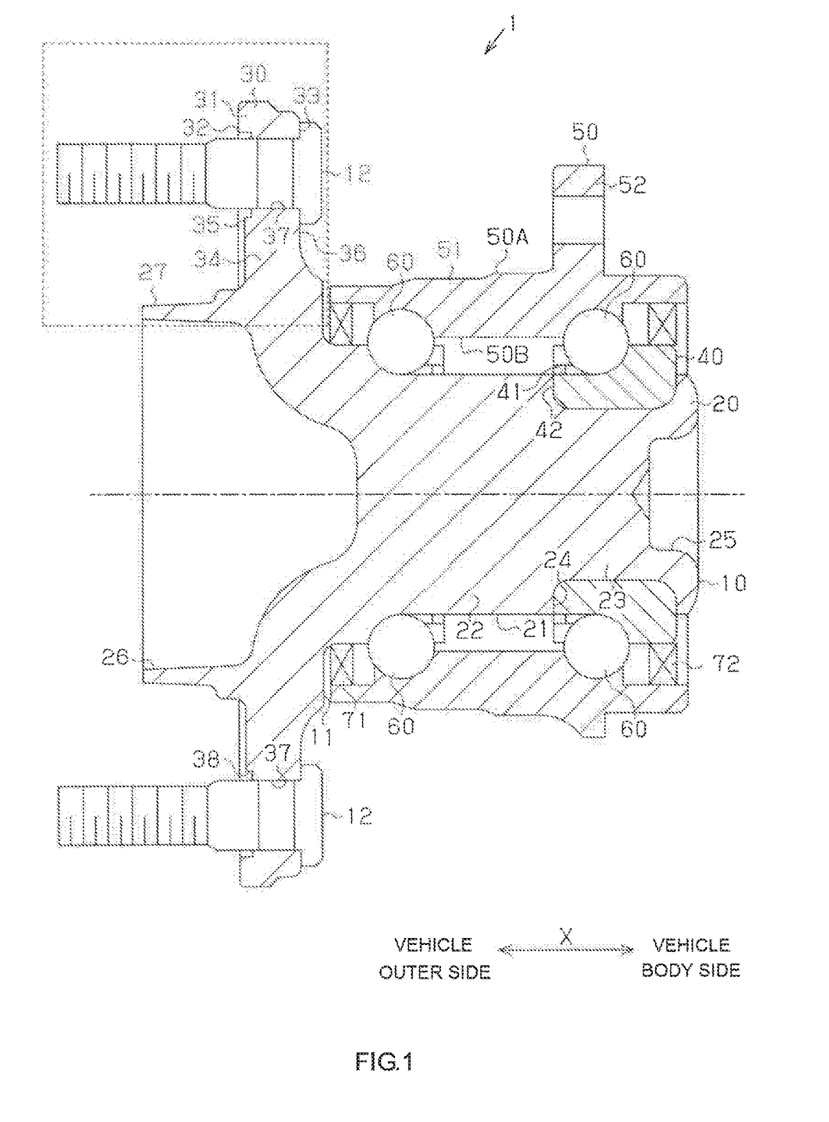
FIG 1 is a sectional view showing a vehicle bearing apparatus according to a first embodiment.

A configuration of a vehicle bearing apparatus 1 according to a first embodiment will be described with reference to FIG. 1 to FIG. 3. As shown in FIG. 1, a vehicle bearing apparatus 1 includes a hub ring 10, an inner ring body 40, an outer ring member 50, rolling elements 60, a first seal member 71, and a second seal member 72. The hub ring 10 and the inner ring body 40 constitute an inner ring member.

The hub ring 10 has a seal facing surface 11, bolts 12, a shaft body portion 20, an inner side hole 25, an outer side hole 26, a fitting portion 27, and a flange portion 30. The seal facing surface 11 corresponds to a "diameter changing surface".

The shaft body portion 20 is formed as a portion that protrudes toward a vehicle body side in an axle direction X beyond the flange portion 30. The shaft body portion 20 has an outer peripheral surface 21, a large-diameter portion 22, a small-diameter portion 23, and a step surface 24. The shaft body portion 20 has a columnar shape. The axle direction X coincides with an axial direction of the hub ring 10. The vehicle outer side in the axle direction X represents a side on which a brake rotor is disposed to the vehicle bearing apparatus 1. The vehicle body side in the axle direction X represents a side close to a vehicle when the vehicle bearing apparatus 1 is fitted to the vehicle.

The large-diameter portion 22 is formed on the vehicle body side in the axle direction X beyond the flange portion 30. The outer peripheral surface 21 of the large-diameter portion 22 forms a raceway surface for the rolling elements 60. The small-diameter portion 23 is formed on the vehicle body side with respect to the large-diameter portion 22 in the axle direction X. The step surface 24 forms a boundary between the large-diameter portion 22 and the small-diameter portion 23. The step surface 24 is orthogonal to the axle direction X.

The inner side hole 25 is formed at an end portion of the shaft body portion 20 on the vehicle body side in the axle direction X. The outer side hole 26 is formed at an end portion of the shaft body portion 20 on the vehicle outer side in the axle direction X. The fitting portion 27 is formed as a portion that protrudes toward the vehicle outer side in the axle direction X beyond the flange portion 30.

Figure 2:
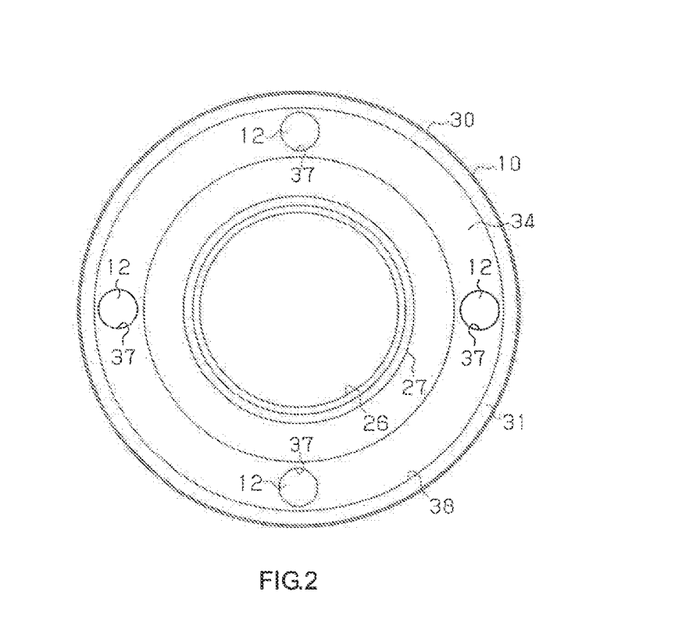
FIG. 2 is a plan view showing a hub ring according to the first embodiment.

As shown in FIG. 2, the flange portion 30 has a thick portion 31, a thin portion 34, bolt holes 37, and a peripheral groove 38. Each bolt hole 37 extends through the flange portion 30 in the axle direction X. The bolts 12 are press-fitted into the bolt holes 37, respectively.

The peripheral groove 38 is formed in a surface of the flange portion 30 on the vehicle outer side in the axle direction X. The peripheral groove 38 is formed at a position coinciding with the bolt holes 37 in a radial direction of the flange portion 30. A width of the peripheral groove 38 is larger than a diameter of each bolt hole 37. Therefore, the entire bolt holes 37 are formed in the peripheral groove 38. An outer periphery of the peripheral groove 38 is formed on an outer peripheral side with respect to the bolt holes 37. An inner periphery of the peripheral groove 38 is formed on an inner peripheral side with respect to the bolt holes 37.

Figure 3:
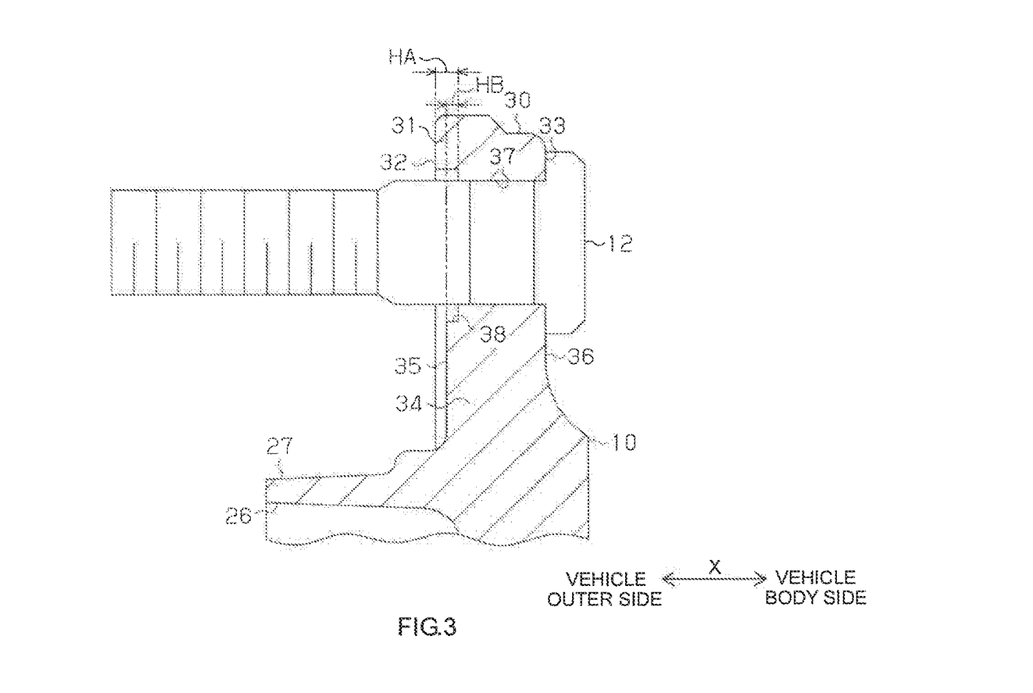
FIG. 3 is a sectional view showing an enlarged portion of the vehicle bearing apparatus according to the first embodiment.

As shown in FIG. 3, the thick portion 31 has a thick portion outer surface 32 and a thick portion inner surface 33. The thick portion 31 is formed in a portion of the flange portion 30, which is located on an outer side with respect to the bolt holes 37 and the peripheral groove 38 in the radial direction. The thick portion outer surface 32 forms a surface of the thick portion 31 on the vehicle outer side in the axle direction X. The thick portion inner surface 33 forms a surface of the thick portion 31 on the vehicle body side in the axle direction X.

The thin portion 34 has a thin portion outer surface 35 and a thin portion inner surface 36. The thin portion 34 is formed in a portion of the flange portion 30, which is located on an inner side with respect to the thick portion 31 and the peripheral groove 38 in the radial direction. A thickness of the thin portion 34 in the axle direction X is smaller than that of the thick portion 31. The thin portion outer surface 35 forms a surface of the thin portion 34 on the vehicle outer side in the axle direction X. The thin portion inner surface 36 forms a surface of the thin portion 34 on the vehicle body side in the axle direction X.

The thick portion outer surface 32 is formed on the vehicle outer side with respect to the thin portion outer surface 35 in the axle direction X. The thick portion outer surface 32 is brought into contact with the brake rotor (not shown) when the vehicle hearing apparatus 1 is fitted to the brake rotor. The thin portion outer surface 35 faces the brake rotor across a gap when the vehicle bearing apparatus 1 is fitted to the brake rotor.

A length HA from a bottom surface of the peripheral groove 38 to the thick portion outer surface 32 is larger than a length HB from the bottom surface of the peripheral groove 38 to the thin portion outer surface 35. A difference between the distance HA and the distance HB is set to, for example, 0.1 mm.

As shown in FIG. 1, the seal facing surface 11 is formed in the shaft body portion 20. The seal facing surface 11 is formed between the flange portion 30 and the large-diameter portion 22. The seal facing surface 11 faces a first seal member 71.

The inner ring body 40 has an outer peripheral surface 41 and an outer side contact surface 42. The inner ring body 40 is press-fitted into the small-diameter portion 23. The inner ring body 40 is disposed to abut on the step surface 24. The outer side contact surface 42 is orthogonal to the axle direction X. The outer side contact surface 42 is in contact with the step surface 24.

The outer ring member 50 has an outer peripheral surface 50A, an inner peripheral surface 50B, a cylindrical portion 51, and a flange portion 52. The outer ring member 50 has a cylindrical shape. The inner peripheral surface 50B of the cylindrical portion 51 forms a raceway surface for the rolling elements 60. The flange portion 52 protrudes toward an area outside the cylindrical portion 51.

The rolling elements 60 form a row on the vehicle outer side and a row on the vehicle body side. The row of the rolling elements 60 on the vehicle outer side is disposed between the outer peripheral surface 21 of the large-diameter portion 22 and the inner peripheral surface 50B of the outer ring member 50. The row of the rolling elements 60 on the vehicle body side is disposed between the outer peripheral surface 41 of the inner ring body 40 and the inner peripheral surface 50B of the outer ring member 50.

The first seal member 71 is disposed between the inner peripheral surface 50B of the outer ring member 50 and the outer peripheral surface 21 of the shaft body portion 20. The first seal member 71 is disposed on the vehicle body side with respect to the flange portion 30 in the axle direction X. The first seal member 71 faces the seal facing surface 11.

The second seal member 72 is disposed between the inner peripheral surface 50B of the outer ring member 50 and the outer peripheral surface 41 of the inner ring body 40. The second seal member 72 is disposed on the vehicle body side with respect to the first seal member 71 in the axle direction X.

A method for manufacturing the vehicle bearing apparatus 1 will be described with reference to FIG. 4 to FIG. 6. The method for manufacturing the vehicle bearing apparatus 1 includes a component manufacturing step, a hub ring manufacturing step, and a component assembling step. The inner ring body 40, the outer ring member 50, the rolling elements 60, the first seal member 71, and the second seal member 72 are individually manufactured at the component manufacturing step. An intermediate product 200 of the hub ring 10 is manufactured at an intermediate product manufacturing step. The hub ring manufacturing step includes the intermediate product manufacturing step, a bolt press fitting step, a reference surface processing step, an outer surface processing step, and a hardening step.

At the intermediate product manufacturing step, the intermediate product 200 is manufactured. FIG. 4 shows an example of the intermediate product 200. In the intermediate product 200, the seal facing surface 11, the shaft body portion 20, and the flange portion 30 are formed by forging. In the intermediate product 200, the thin portion outer surface 35 and the peripheral groove 38 are formed in the flange portion 30 by turning and the like.

Figure 4:
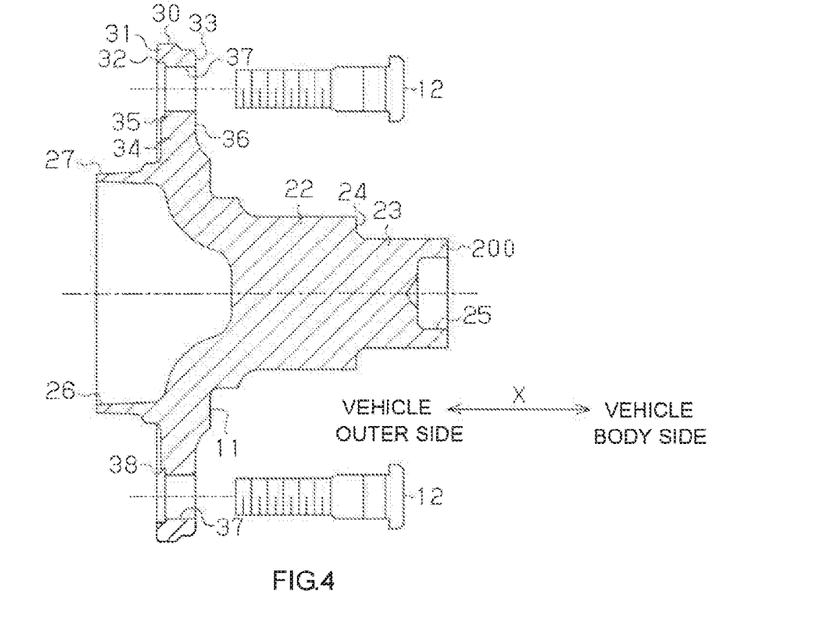
FIG. 4 is a sectional view relating to a bolt press fitting step according to the first embodiment, and showing the hub ring taken along an axle direction.

FIG. 4 shows a working state in the bolt press fitting step. The bolts 12 are press-fitted into the bolt holes 37, respectively. At this time, the thick portion outer surface 32 and the thin portion outer surface 35 may be warped by press fitting of the bolts 12.

Figure 5:
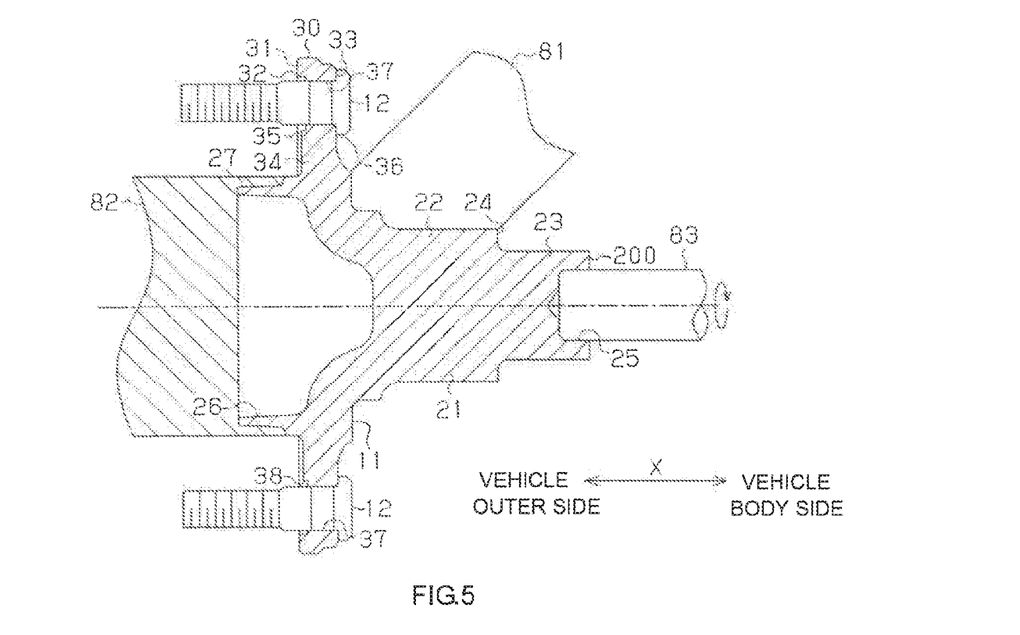
FIG. 5 is a sectional view relating to a reference surface processing step according to the first embodiment, and showing the hub ring taken along the axle direction.

FIG. 5 shows a working state in the reference surface processing step. The seal facing surface 11 and the outer peripheral surface 21 are ground. A support apparatus 82 is fitted onto the fitting portion 27, and hence the intermediate product 200 is supported from the vehicle outer side in the axle direction X. A rotating apparatus 83 is disposed to abut on the inner side hole 25 in the intermediate product 200. A grindstone 81 is disposed to be in contact with a portion of the outer peripheral surface 21, the portion extending from the seal facing surface 11 to the step surface 24, in the intermediate product 200. The grindstone 81 has a shape corresponding to the portion of the outer peripheral surface 21, the portion extending from the seal facing surface 11 to the step surface 24. The intermediate product 200 is supported by the support apparatus 82 and rotated by the rotating apparatus 83 while being in contact with the grindstone 81. As a result, the intermediate product 200 is ground. Since the seal facing surface 11 is subjected to grinding, the seal facing surface 11 is orthogonal to the axle direction X.

Figure 6:
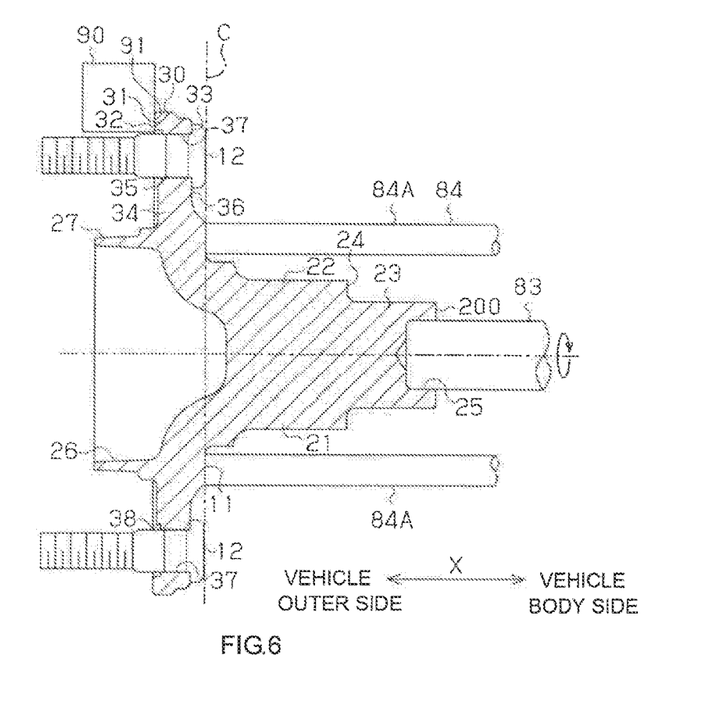
FIG. 6 is a sectional view relating to an outer surface processing step according to the first embodiment, and showing the hub ring taken along the axle direction.

FIG. 6 shows a working state in the outer surface processing step. The thick portion outer surface 32 is subjected to turning. The rotating apparatus 83 is disposed to abut on the inner side hole 25 in the intermediate product 200. A plurality of rod-shaped members 84A of a backup apparatus 84 are disposed to abut on the seal facing surface 11 from the vehicle body side in the axle direction X, in the intermediate product 200. A distal end portion of each rod-shaped member 84A is disposed on a virtual plane C orthogonal to the axle direction X. Therefore, the intermediate product 200 is maintained in a state in which the seal facing surface 11 is orthogonal to the axle direction X, by the backup apparatus 84. A turning surface 91 of a turning apparatus 90 is disposed to abut on the thick portion outer surface 32, in the intermediate product 200. The turning apparatus 90 performs turning on the thick portion outer surface 32 while using he seal facing surface 11 as a reference surface. The turning surface 91 of the turning apparatus 90 is orthogonal to the axle direction X. At this time, the intermediate product 200 is sandwiched between the turning surface 91 and the rod-shaped members 84A from both sides in the axle direction X. The intermediate product 200 is rotated by the rotating apparatus 83. At this time, turning is performed on the intermediate product 200 by the turning apparatus 90. Since the thick portion outer surface 32 is subjected to turning, a degree of parallelism of the thick portion outer surface 32 relative to the reference surface is increased. Turning corresponds to "machining".

At the hardening step, induction hardening is performed on the outer peripheral surface 21 of the intermediate product 200. At the hardening step, the hub ring 10 is manufactured. At the component assembling step, the inner ring body 40, the outer ring member 50, the rolling elements 60, the first seal member 71, and the second seal member 72 are fitted to the hub ring 10. The inner ring body 40 is press-fitted into the small-diameter portion 23 from the vehicle body side in the axle direction X and disposed to abut on the step surface 24 of the hub ring 10. The first seal member 71 is disposed in a portion facing the seal facing surface 11. The rolling elements 60 and the outer ring member 50 are disposed around the outer periphery of the inner ring body 40 and the shaft body portion 20. After the inner ring body 40 is press-fitted onto the small-diameter portion 23, the end portion of the hub ring 10 on the vehicle body side in the axle direction X is clinched. As a result, the end portion of the hub ring 10 on the vehicle body side is deformed into the shape shown in FIG. 1. The vehicle bearing apparatus 1 shown in FIG. 1 is manufactured through the component assembling step.

A function of the vehicle bearing apparatus 1 will be described. The thick portion outer surface 32 may be warped due to press fitting of the bolts 12. On the other hand, the thick portion processing step is performed after the bolt press fitting step. Therefore, the warp of the thick portion outer surface 32 caused due to the press fitting of the bolts 12 is reduced.

The vehicle bearing apparatus 1 and the manufacturing method thereof provide the following effects. (1) According to the method for manufacturing the hub ring 10, the outer surface processing step is performed after the bolt press fitting step. Therefore, the warp of the thick portion outer surface 32 caused due to the press fitting of the bolts 12 is reduced. Therefore, flange runout is suppressed.

(2) The method for manufacturing the hub ring 10 provides the advantageous effect as compared with a virtual first manufacturing method. The virtual first manufacturing method is different from the method for manufacturing the vehicle bearing apparatus 1 in the following point, but the virtual first manufacturing method has the same contents as those of the method for manufacturing the vehicle bearing apparatus 1 in any other point. According to the virtual first manufacturing method, turning is performed on the thick portion outer surface 32, by using, as the reference surface, the seal facing surface 11 that has not been subjected to the reference surface processing step with the use of grinding. When turning is performed, a contact position of the distal end portion of each rod-shaped member 84A on the seal facing surface 11 varies in accordance with rotation of the intermediate product 200. In the virtual first manufacturing method using the seal facing surface 11, which has not been subjected to grinding, as the reference surface, the degree of unevenness of the seal facing surface 11 is large. Therefore, the intermediate product 200 is likely to he moved in the axle direction X due to the rotation and the intermediate product 200 is likely to be inclined relative to the axle direction X due to the rotation.

On the other hand, according to the method for manufacturing the hub ring 10, turning is performed on the thick portion outer surface 32 using the seal facing surface 11 subjected to grinding as the reference surface. A degree of parallelism of the seal facing surface 11 with respect to the surface orthogonal to the axle direction X has been improved due to grinding. In other words, the unevenness of the seal facing surface 11 is reduced due to grinding. Therefore, in the method for manufacturing the hub ring 10, the intermediate product 200 is less likely to be moved in the axle direction X due to the rotation and the intermediate product 200 is less likely to be inclined relative to the axle direction X due to the rotation, as compared to the virtual first manufacturing method. Therefore, it is possible to increase the degree of parallelism of the thick portion outer surface 32 with respect to the surface orthogonal to the axle direction X as compared to the virtual first manufacturing method. Therefore, it is possible to more appropriately suppress the flange runout.

(3) The thick portion 31 is formed in the portion of the flange portion 30, which is located on the outer side with respect to the bolt holes 37. Therefore, it is possible to easily perform turning with the use of the turning apparatus 90. (4) The thick portion outer surface 32 is subjected to machining by using the seal facing surface 11 orthogonal to the axle direction X as the reference surface. Therefore, it is possible to improve a processing accuracy for the thick portion outer surface 32.

Figure 7:
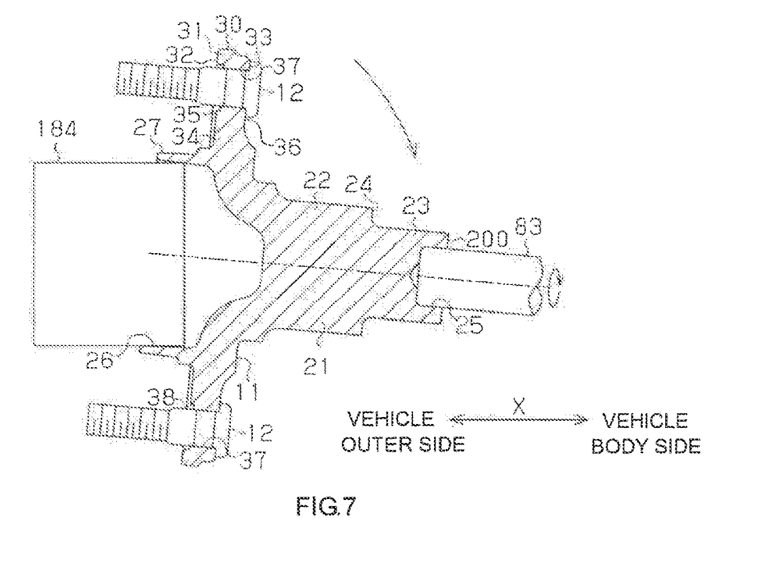
FIG. 7 is a sectional view relating to an outer surface processing step according to a virtual second manufacturing method, and showing a hub ring taken along the axle direction.

The method for manufacturing the hub ring 10 provides the advantageous effect as compared to a virtual second manufacturing method. The virtual second manufacturing method is different from the method for manufacturing the vehicle bearing apparatus 1 in the following point, but the virtual second manufacturing method has the same contents as those of the method for manufacturing the vehicle bearing apparatus 1 in any other point. As shown in FIG. 7, at an outer surface processing step in the virtual second manufacturing method, the intermediate product 200 is supported at the inner peripheral surface of the intermediate product 200, which defines the outer side hole 26, by using a support apparatus 184. At the outer surface processing step in the virtual second manufacturing method, turning is performed on the thick portion outer surface 32 by using, as a reference surface, the inner peripheral surface defining the outer side hole 26, which is supported by the support apparatus 184. At this time, if there is a difference between an outside diameter of the support apparatus 184 and an inside diameter of the inner peripheral surface defining the outer side hole 26, a gap is formed between an outer peripheral surface of the support apparatus 184 and the inner peripheral surface defining the outer side hole 26. Therefore, as shown in FIG. 7, the shaft body portion 20 may be inclined during turning. If turning is performed in a state in which the shaft body portion 20 is inclined, the thick portion outer surface 32 is inclined relative to the axle direction X. Therefore, the effect for suppressing the flange runout may be reduced. The support apparatus 184 in the virtual second manufacturing method supports the inner peripheral surface defining the outer side hole 26, but it is considered that the same problem may occur in a configuration where the outer peripheral surface 21 and the inner peripheral surface defining the inner side hole 25 are supported.

On the other hand, according to the method for manufacturing the vehicle bearing apparatus 1, at the outer surface processing step, the seal facing surface 11 of the intermediate product 200 is supported by the rod-shaped members 84A, and turning is performed on the thick portion outer surface 32 of the intermediate product 200 by using the turning surface 91. As described above, the intermediate product 200 is subjected to turning in a state in which the seal facing surface 11 and the thick portion outer surface 32 are supported from both sides in the axle direction X. Therefore, in the method for manufacturing the vehicle bearing apparatus 1, the shaft body portion 20 is not likely to be inclined at the outer surface processing step, unlike in the virtual second manufacturing method. Therefore, a processing accuracy for the thick portion outer surface 32 is improved.

(5) The degree of warp caused due to the press fitting of the bolts 12 increases toward the bolt holes 37. The hub ring 10 has the peripheral groove 38. The outer periphery of the peripheral groove 38 is formed on the outer peripheral side with respect to the bolt holes 37. Therefore, it is possible to reduce the warp of the thick portion outer surface 32 by the press fitting of the bolts 12.

A vehicle bearing apparatus 1 according to a second embodiment has a configuration that is different from the configuration of the vehicle bearing apparatus 1 according to the first embodiment in the following portions, and that is the same as the configuration of the vehicle bearing apparatus 1 according to the first embodiment in any other portion. In a description of the vehicle bearing apparatus 1 according to the second embodiment, the same reference numerals as those in the vehicle bearing apparatus 1 according to the first embodiment are assigned to the same portions as those of the vehicle bearing apparatus 1 according to the first embodiment.

Figure 8:
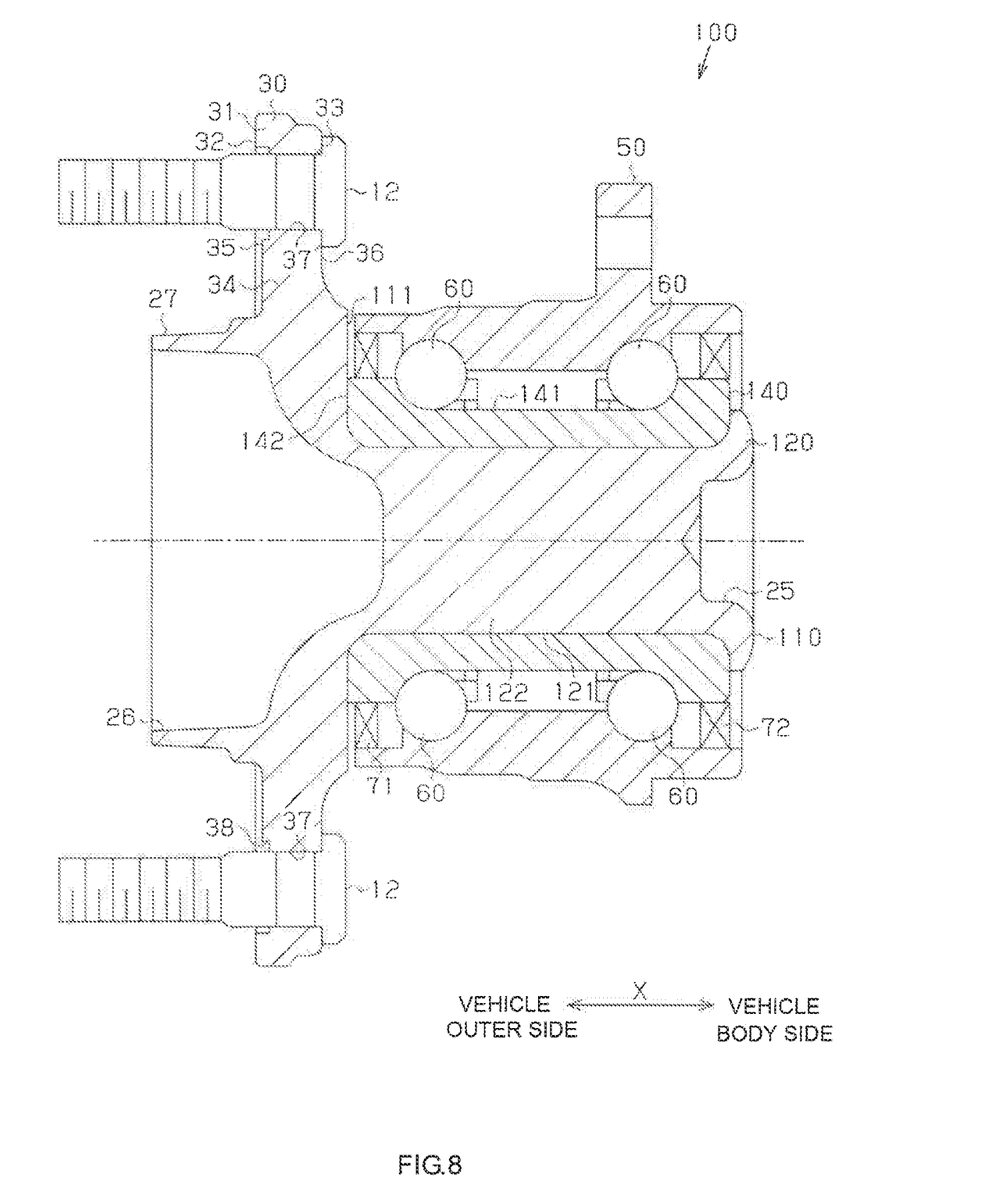
FIG. 8 is a sectional view showing a vehicle bearing apparatus according to a second embodiment.

As shown in FIG. 8, the vehicle bearing apparatus 100 according to the second embodiment includes a hub ring 110, an inner ring body 140, an outer ring member 50, rolling elements 60, a first seal member 71, and a second seal member 72.

The hub ring 110 includes an inner ring facing surface 111, bolts 12, a shaft body portion 120, and a flange portion 30. The shaft body portion 120 has an outer peripheral surface 121. The shaft body portion 120 has a columnar shape. The inner ring facing surface 111 faces the first seal member 71 and the inner ring body 140. The inner ring facing surface 111 corresponds to a "diameter changing surface", a "step surface", and a "seal facing surface".

The inner ring body 140 has an outer peripheral surface 141 and an outer side contact surface 142. The inner ring body 140 is press-fitted into the shaft body portion 20. The inner ring body 140 is disposed to abut on the inner ring facing surface 111. The outer side contact surface 142 is orthogonal to the axle direction X. The outer side contact surface 142 is in contact with the inner ring facing surface 111.

A row of the rolling elements 60 on the vehicle outer side and a row of the rolling elements 60 on the vehicle body side are disposed between the outer peripheral surface 141 of the inner ring body 140 and an inner peripheral surface 50B of the outer ring member 50. The first seal member 71 is disposed between the inner peripheral surface 50B of the outer ring member 50 and the outer peripheral surface 141 of the inner ring body 140. The first seal member 71 faces the inner ring facing surface 111. The second seal member 72 is disposed between the inner peripheral surface 50B of the outer ring member 50 and the outer peripheral surface 141 of the inner ring body 140.

Figure 9:
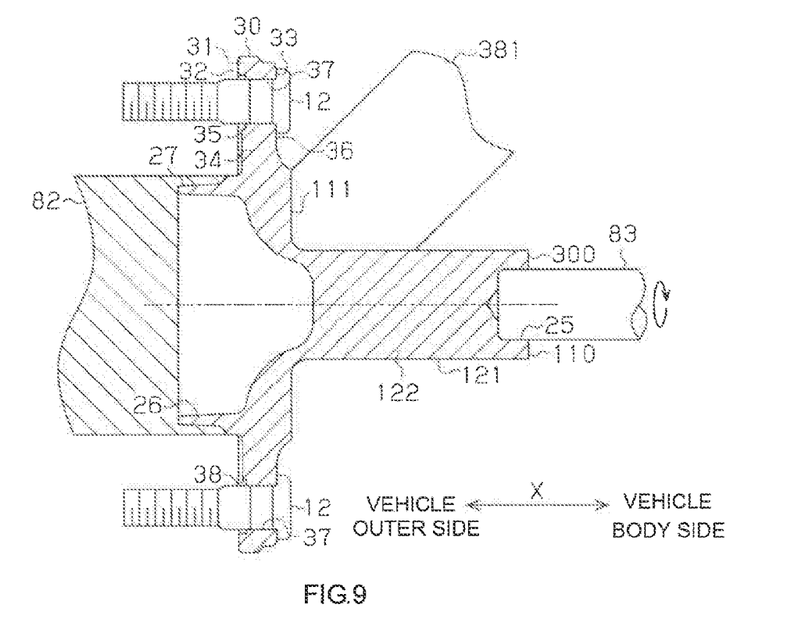
FIG. 9 is a sectional view relating to a reference surface processing step according to the second embodiment, and showing the hub ring taken along the axle direction.

A method for manufacturing the vehicle bearing apparatus 1 will be described with reference to FIG. 9. FIG. 9 shows a working state in a reference surface processing step. The inner ring facing surface 111 is ground by using a grindstone 381, a support apparatus 82, and a rotating apparatus 83. The grindstone 381 corresponds to the inner ring facing surface 111 and a portion of the outer peripheral surface 122 in the intermediate product 300, the portion being located on the vehicle body side with respect to the inner ring facing surface 111 in the axle direction X. Since the inner ring facing surface 111 is subjected to grinding, the inner ring facing surface 111 is orthogonal to the axle direction X.

A thick portion outer surface 32 is subjected to turning by a turning apparatus 90 (see FIG. 6) at an outer surface processing step. Each rod-shaped member 84A (see FIG. 6) is disposed to abut on the inner ring facing surface 111 orthogonal to the axle direction X from the vehicle body side in the axle direction X at the reference surface processing step. The thick portion outer surface 32 is subjected to turning by using the inner ring facing surface 111 as the reference surface. Since the thick portion outer surface 32 is subjected to turning, the thick portion outer surface 32 is parallel to the reference surface and orthogonal to the axle direction X.

The vehicle bearing apparatus 1 according to the second embodiment provides substantially the same effects as the effect (1) provided by the vehicle bearing apparatus 1 according to the first embodiment, i.e., the effect of suppressing the flange runout and the effects (2) to (5) provided by the vehicle bearing apparatus 1 according to the first embodiment.

The method for manufacturing the vehicle bearing apparatus according to the invention includes embodiments other than the respective foregoing embodiments. Modified examples of the respective foregoing embodiments will be described as other embodiments of the method for manufacturing the vehicle bearing apparatus according to the invention. The following modified examples can be combined with each other.

The thick portion outer surface 32 according to the first embodiment is subjected to turning by using the seal facing surface 11 as the reference surface. However, the processing method for the thick portion outer surface 32 is not restricted to that exemplified in the first embodiment. For example, the thick portion outer surface 32 according to a modified example is subjected to turning by using the step surface 24 as the reference surface. Since this step surface 24 is ground at the reference surface processing step, the step surface 24 is orthogonal to the axle direction X.

The vehicle bearing apparatus 1 according to the second embodiment includes one inner ring body 140. However, the configuration of the inner ring body 140 is not restricted to that exemplified in the second embodiment. For example, the inner ring body 140 in the vehicle bearing apparatus 1 according to a modified example includes a first portion and a second portion that are different bodies. The first portion has a raceway surface for the row of the rolling elements 60 on the vehicle outer side. The second portion has a raceway surface for the row on the vehicle body side.

The thick portion outer surface 32 according to each embodiment is subjected to turning by using a surface orthogonal to the axle direction X as the reference surface. However, the processing method for the thick portion outer surface 32 is not restricted to that exemplified in each embodiment. For example, the thick portion outer surface 32 according to a modified example is subjected to turning by using a surface parallel to the axle direction X as the reference surface. As the surface parallel to the axle direction X, for example, the outer peripheral surface 21 or 121 of the shaft body portion 20 or 120 is used. Since the outer peripheral surface 21 or 121 of the shaft body portion 20 or 120 is ground at the reference surface processing step, it is parallel to the axle direction X.

The thick portion outer surface 32 according to each embodiment is subjected to turning at the outer surface processing step. However, the processing method for the thick portion outer surface 32 is not restricted to that exemplified in each embodiment. For example, the thick portion outer surface 32 according to a modified example is ground at the outer surface processing step. In short, it is possible to employ an arbitrary processing method as the processing method for the thick portion outer surface 32 as long as the method is a machining method that makes it possible to reduce warp of the thick portion outer surface 32.

According to the method for manufacturing the vehicle bearing apparatus 1 of each embodiment, the support apparatus 82 is fitted onto the fitting portion 27, and the rotating apparatus 83 is inserted into the inner side hole 25. However, the method for manufacturing the vehicle hearing apparatus 1 is not restricted to this method. For example, according to the method for manufacturing the vehicle bearing apparatus 1 of a modified example, the support apparatus 82 is inserted into the inner side hole 25. and the rotating apparatus 83 is fitted onto the fitting portion 27. In short, the configurations of the support apparatus 82 and the rotating apparatus 83 may be appropriately changed as long as the support apparatus 82 and the rotating apparatus 83 are able to support and rotate the intermediate product 200 or 300.

Figure 10:
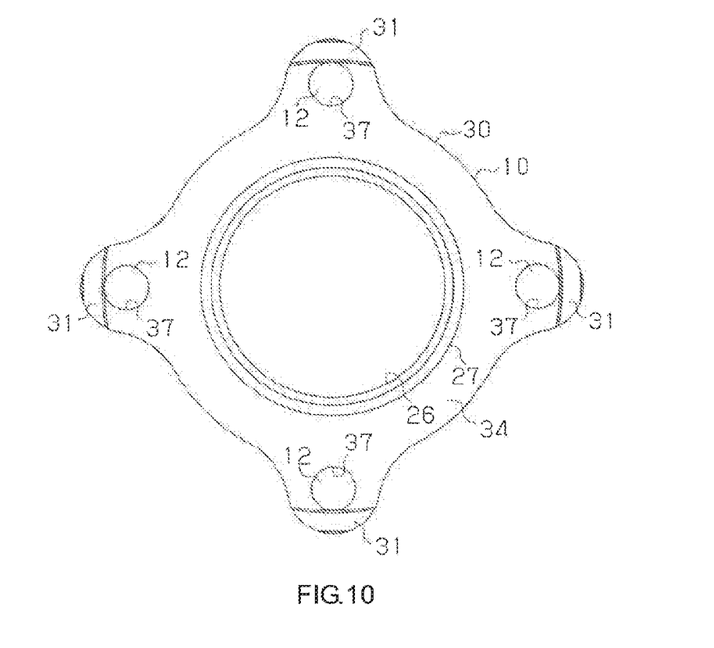
FIG. 10 is a plan view showing a hub ring according to other embodiments.

The flange portion 30 according to each embodiment has the circular shape. However, the shape of the flange portion 30 is not restricted to that exemplified in each embodiment. For example, the flange portion 30 according to a modified example shown in FIG. 10 has thinned portions. Each thinned portion is formed at a part between the bolt holes 37 adjacent to each other on the circumference of the flange portion 30.

The method for manufacturing a hub ring and the method for manufacturing a vehicle bearing apparatus according to the invention make it possible to suppress the flange runout.

What is claimed is:

1. A method for manufacturing a vehicle bearing apparatus, the vehicle bearing apparatus including a hub ring, an inner ring body, an outer ring member, rolling elements, and a seal member, the hub ring including a flange portion, a shaft body portion, a step surface, and a seal facing surface, the flange portion including bolt holes, an outer surface, and bolts, wherein the flange portion is formed on an outer periphery of the shaft body portion, and the outer surface forms a surface of the flange portion on a vehicle outer side in an axle direction, the method comprising:
   press-fitting the bolts into the bolt holes, respectively;
   forming a reference surface in the shaft body portion by performing grinding on the seal facing surface, the reference surface being orthogonal to the axle direction;
   performing machining on the outer surface by using the reference surface as a reference after the bolts are press-fitted into the bolt holes, respectively, wherein machining is applied to the outer surface with reference to the reference surface in a state in which the shaft body portion is supported by a rotation device, the flange portion contacts a turning device, and the seal facing surface contacts a backup device, after the bolts are press-fitted into the bolt holes, wherein the seal facing surface contacts the backup device for support and is not machined by the backup device; and
   disposing the inner ring body so that the inner ring body abuts on the step surface of the hub ring in the axle direction, disposing the seal member in a portion facing the seal facing surface, and disposing the rolling elements and the outer ring member around an outer periphery of the inner ring body and the shaft body portion.

* * * * *